US008854312B2

(12) United States Patent  
Meierling

(10) Patent No.: US 8,854,312 B2
(45) Date of Patent: Oct. 7, 2014

(54) KEY ASSEMBLY FOR ELECTRONIC DEVICE

(75) Inventor: Klaus-Dieter Meierling, Bochum (DE)

(73) Assignee: BlackBerry Limited, Waterloo (CA)

( * ) Notice: Subject to any disclaimer, the term of this patent is extended or adjusted under 35 U.S.C. 154(b) by 236 days.

(21) Appl. No.: 13/490,626

(22) Filed: Jun. 7, 2012

(65) Prior Publication Data

US 2013/0106706 A1    May 2, 2013

Related U.S. Application Data

(60) Provisional application No. 61/552,926, filed on Oct. 28, 2011.

(51) Int. Cl.
*G06F 3/02* (2006.01)
*H01H 13/83* (2006.01)

(52) U.S. Cl.
CPC ......... *H01H 13/83* (2013.01); *H01H 2219/062* (2013.01); *H01H 2219/064* (2013.01); *H01H 2219/06* (2013.01)
USPC ............................. 345/170; 345/168; 345/175

(58) Field of Classification Search
CPC ......... G06F 3/02; G06F 3/0489; H01H 13/85; G09G 3/02
USPC ......... 345/168, 169, 170, 156, 158, 175, 176; 200/314, 520; 341/22; 362/84, 611, 362/602; 348/207.99; 235/145 R
See application file for complete search history.

(56) References Cited

U.S. PATENT DOCUMENTS 5,736,976 A * 4/1998 Cheung ........................ 345/168
7,520,652 B2 4/2009 Yamashita et al.
7,538,832 B2 5/2009 Hong et al.
7,705,835 B2 * 4/2010 Eikman ......................... 345/176
7,736,044 B2 6/2010 Chew et al.
2002/0131261 A1 9/2002 Inui et al.

(Continued)

FOREIGN PATENT DOCUMENTS

EP     1758140 A1    2/2007
WO  2008077987 A1    7/2008

OTHER PUBLICATIONS

Agilent Technologies: "Light Guide Techniques Using LED Lamps"; Application Brief I-003; product information; Dec. 7, 2011, 22 pages.

(Continued)

*Primary Examiner* — Thuy Pardo
(74) *Attorney, Agent, or Firm* — Fitch, Even, Tabin & Flannery LLP

(57) ABSTRACT

A key assembly for an electronic device that includes a keycap defining a key that has a non-opaque portion to identify the key that is backlit. The assembly includes a light guide positioned in spaced relation to the keycap. An optical radiation source, such as top-fire light emitting diode, is mounted below the lower surface of the light guide. A mask is disposed on the top surface of the optical radiation source. The mask includes an aperture to allow light from the optical radiation source to pass into the light guide, and the mask blocks at least a portion of the light from the optical radiation source. The mask blocks a portion of the top surface of the optical radiation source that emits tinted light. The light guide is affixed atop the opaque mask such that it is nearly directly affixed to the optical radiation source.

20 Claims, 6 Drawing Sheets

(56) References Cited

U.S. PATENT DOCUMENTS

| | | | |
|---|---|---|---|
| 2003/0098844 A1* | 5/2003 | Melnyk | 345/156 |
| 2006/0227120 A1* | 10/2006 | Eikman | 345/175 |
| 2007/0057031 A1* | 3/2007 | Lee | 235/145 R |
| 2007/0152965 A1 | 7/2007 | Krzyzanowski et al. | |
| 2007/0159854 A1 | 7/2007 | Kokubu et al. | |
| 2007/0285913 A1 | 12/2007 | Cybart et al. | |
| 2008/0123015 A1 | 5/2008 | Tanaka | |
| 2008/0129551 A1* | 6/2008 | Gao et al. | 341/22 |
| 2008/0175022 A1 | 7/2008 | Sugiura et al. | |
| 2009/0003014 A1* | 1/2009 | Jablonski | 362/602 |
| 2009/0033937 A1* | 2/2009 | Oh et al. | 356/366 |
| 2009/0173610 A1* | 7/2009 | Bronstein et al. | 200/314 |
| 2009/0260965 A1 | 10/2009 | Chang | |
| 2010/0026818 A1* | 2/2010 | Yang et al. | 348/207.99 |
| 2010/0118509 A1* | 5/2010 | Kwon et al. | 362/84 |
| 2010/0200382 A1 | 8/2010 | Kim et al. | |
| 2010/0273530 A1 | 10/2010 | Jarvis et al. | |
| 2010/0283935 A1 | 11/2010 | Park et al. | |
| 2010/0288608 A1 | 11/2010 | Ko et al. | |
| 2010/0328219 A1* | 12/2010 | Lombardi et al. | 345/169 |
| 2011/0128463 A1 | 6/2011 | Ji et al. | |
| 2011/0141397 A1 | 6/2011 | Lee | |
| 2011/0149599 A1* | 6/2011 | Wei et al. | 362/611 |
| 2012/0168294 A1* | 7/2012 | Pegg | 200/520 |
| 2012/0169603 A1* | 7/2012 | Peterson et al. | 345/168 |
| 2012/0268384 A1* | 10/2012 | Peterson et al. | 345/170 |

OTHER PUBLICATIONS

Global Lighting Technologies Inc.: "Next Generation Cell Phone Backlighting: MicroLens™ Molded White LED Light Guides"; product information, Jul. 2007; 2 pages.

Lumileds Lighting, U.S., LLC: "Luxeon DDC, For LCD Backlighting"; Application Brief AB27; product information; Jan. 2005; 38 pages.

Avago Technologies: "Innovate Keypad Design with Light Guides and LEDs"; White Paper; product information; Nov. 17, 2009; 14 pages.

Extended European Search Report from related European Patent Application No. 12171135.2; dated Sep. 19, 2012; 6 pages.

* cited by examiner

KEY ASSEMBLY FOR ELECTRONIC DEVICE

CROSS-REFERENCE TO RELATED APPLICATIONS

The present application claims priority to U.S. patent application Ser. No. 61/552,926 filed Oct. 28, 2011, and owned in common herewith, the contents of which are hereby incorporated by reference.

TECHNICAL FIELD

The present disclosure relates to electronic devices, and, more particularly, to key assemblies for electronic devices.

BACKGROUND

Electronic devices often have a number of physical keys which may be used for inputting instructions to such devices. In order to facilitate use of electronic devices in low lighting conditions, electronic devices sometimes backlight such physical keys. When backlighting keys, an effect known as light leak may sometimes occur. Light leak occurs when light is emitted from undesirable portions of the electronic device. This can result in unbalanced and unattractive backlighting of keys.

To avoid having to provide a light source beneath every key, the light from a light source (e.g. a light emitting diode) is guided to multiple keys. In some devices, a light guide foil is positioned underneath a set of keys and the light guide foil functions to spread out the light from the light source. In some cases, a side-fire LED or similar source is used to inject light into the foil. However, side-fire LEDs tend to be costly. Top-fire LEDs are thus sometimes used as a light source to inject light into the foil; however, this arrangement presents difficulties when designing to ensure a shallow depth to the key assembly.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION OF EXAMPLE EMBODIMENTS

In one aspect, the present disclosure describes a key assembly for an electronic device. The key assembly includes an optical radiation source having a surface through which light is emitted, in use; a mask blocking a portion of the light emitted by the optical radiation source, in use; a light guide; and a keycap, defining a key, the keycap having a non-opaque portion; and wherein the mask is located between the surface and the light guide, and the light guide is located between the mask and the keycap, such that the keycap receives optical radiation emitted from the optical radiation source that is not blocked by the mask.

In another aspect, the present application describes electronic devices that incorporate the key assembly described herein.

Other example embodiments of the present disclosure will be apparent to those of ordinary skill in the art from a review of the following detailed description in conjunction with the drawings.

Although the description herein refers to light emitting diodes (LEDs), the present application is applicable to optical radiation sources more generally and is not necessarily limited to LEDs in particular.

Figure 1:
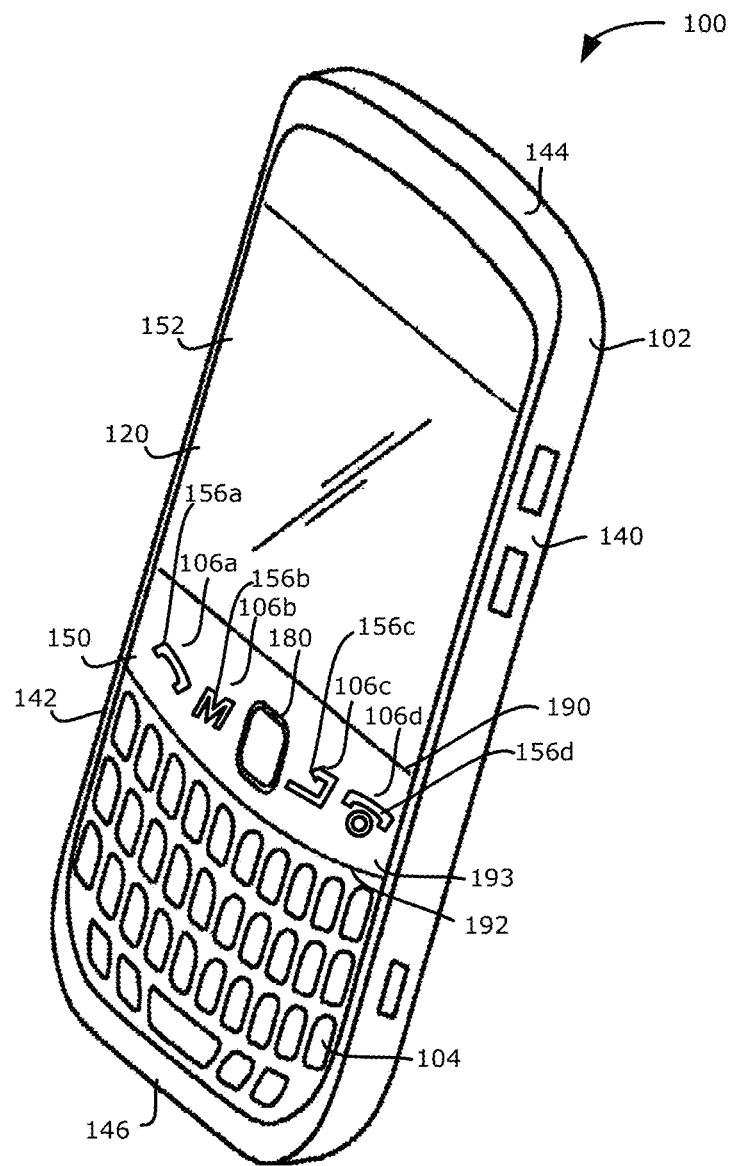
FIG. 1 is a front perspective view of an example electronic device having a key lighting assembly in accordance with example embodiments of the present disclosure.

Reference is now made to FIG. 1, which shows a perspective view of an example electronic device 100. In the example embodiment shown, the electronic device 100 is a handheld mobile communication device. However, the teachings described herein may be applied to other electronic devices. Such electronic devices may, in various example embodiments, include portable electronic devices such as mobile communication devices, including pagers, smartphones, cellular phones, global positioning system (GPS) navigation devices and other satellite navigation devices, wireless organizers, wireless personal digital assistants (PDA), desktop, netbook and notebook computers and tablet computers. The electronic devices may, in various embodiments, be devices without wireless communication capabilities such as PDAs, electronic gaming devices, digital photograph albums or picture frames, digital cameras or digital video recorders. These examples are intended to be non-limiting.

The electronic device 100 includes a housing 102 which contains various electronic components which control operation of the electronic device 100. Such electronic components may include, for example, one or more processors. Other example electronic components which may be housed in the housing 102 will be discussed in greater detail below.

In some example embodiments, the electronic device 100 includes a physical keyboard or keypad 104. The keyboard or keypad 104 may be an alphanumeric keyboard or keypad which facilitates entry of alphanumeric characters into the electronic device 100. In at least some example embodiments, the keyboard or keypad 104 may be a QWERTY or DVORAK keyboard. The keyboard or keypad 104 includes a plurality of keys which are actuatable by a user to provide inputs to the electronic device 100.

In the example embodiment, the physical keyboard or keypad 104 is exposed by the housing 102 through a front surface of the housing 102. However, other keyboard or keypad 104 orientations are also possible. For example, in some example embodiments, the keyboard or keypad 104 is a sliding keyboard or foldout keyboard which is movable between an exposed position in which keys of the keyboard or keypad 104 are exposed and a protected position in which keys of the keyboard or keypad 104 are protected. That is, in the protected position, the keys of the keyboard or keypad 104 are hidden by other features of the electronic device 100. In yet other example embodiments (not illustrated), the electronic device 100 may be an electronic device which does not include a physical keyboard or keypad 104. Instead, alphanumeric input may be achieved through the use of a virtual keyboard displayed on a touchscreen of the electronic device 100.

The housing 102 houses a display assembly 120. In the example embodiment illustrated, the display assembly 120 is disposed within the housing 102 facing the same direction as the keyboard or keypad 104. More particularly, in the example embodiment illustrated, the electronic device 100 is oriented in a portrait orientation in which a left side 142 and a right side 140 of the electronic device 100 are longer than a top side 144 and a bottom side 146 of the electronic device 100. In this orientation, the key and display assembly 120 is disposed above the keyboard or keypad 104. That is, the key and display assembly 120 is located closer to the top side 144 than is the keyboard or keypad 104. In this orientation, the keyboard or keypad 104 is actuatable by a user's thumbs when the device 100 is cradled in a user's hands. It will be appreciated that this is an example orientation and that other configurations are possible.

The display assembly 120 includes a display cover 152, which may also be referred to as a lens. The display cover 152 is transparent, permitting users to view the display screen, which is disposed beneath the display cover 152. The display cover 152 protects components disposed there below and inhibits debris and other contaminants from entering the electronic device 100. The display screen displays information in response to commands from one or more processors within the electronic device 100. The display cover 152 may include a touchscreen overlay for accepting touch screen inputs in one embodiment. The display screen may be, in some example embodiments, a liquid crystal display (LCD) module. Alternatively, in at least some example embodiments, the display screen may be another type of display device, such as an organic light emitting diode (OLED) module, a plasma display panel (PDP) module, or the like.

Between the display assembly 120 and the keyboard or keypad 104 is disposed a function key assembly 193. The key assembly 193 includes a keycap 150 defining one or more function keys 106a, 106b, 106c, 106d. In one embodiment, the keycap 150 may be integrally formed with the display cover 152. In some embodiments, the keycap 150 is a separate element from the display cover 152. In yet other embodiments, the keycap 150 is formed as multiple keycaps; for example, one keycap for each function key 106, or one keycap for each pair of function keys.

The function keys 106a, 106b, 106c, 106d are configured to be depressed by a user of the electronic device 100 to input commands to the electronic device 100. In the example illustrated, there are four function keys 106 which are disposed horizontally between the left side 142 and the right side 140 of the electronic device 100. The function which is assigned to each function key 106a, 106b, 106c, 106d by the electronic device 100 may, in at least some example embodiments, vary based on the operating state of the electronic device 100. In the illustrated embodiment, the function keys 106a, 106b, 106c, 106d include a first function key 106a, which may be a send key which may be used to input a command to initiate communications on the electronic device 100. In the illustrated example embodiment, the function keys 106a, 106b, 106c, 106d also include a second function key 106b, which may be a menu key which may be used to input a command to display a menu on a display screen of the electronic device 100. In the illustrated example embodiment, the function keys 106a, 106b, 106c, 106d also include a third function key 106c, which may be an escape key, and which may also be referred to as a back key. The escape key may be used to input a command to exit from an application, module or state or to input a command to return to a previous state, such as a previously viewed web page. In the illustrated example embodiment, the function keys 106a, 106b, 106c, 106d also include a fourth function key 106d, which may be an end or power key. The end or power key may be used to input a command to terminate an operating state, module or application running on the electronic device 102. For example, the end or power key may be used to input a command to hang-up a call or to input a command to power down the electronic device 100.

The function keys 106a, 106b, 106c, 106d each include one or more decorations 156a, 156b, 156c, 156d on the external surface of the keycap 150. The decorations 156a, 156b, 156c, 156d are comprised of icons, text, images, or other indicia which identify a function assigned to the function key 106a, 106b, 106c, 106d associated with that decoration 156a, 156b, 156c, 156d. For example, in the example embodiment illustrated, a telephone icon is used to represent the send key, the letter "M" is used to represent the menu key, a back arrow icon is used to represent the escape key, and an on-cradle telephone icon is used to represent the end or power key. The decorations 156a, 156b, 156c, 156d are each associated with one of the function keys 106a, 106b, 106c, 106d. For example, a first decoration 156a may be associated with the first function key 106a, a second decoration 156b may be associated with the second function key 156b, a third decoration 156c may be associated with the third function key 156c and a fourth decoration 156d may be associated with the fourth function key 156d.

The keycap 150 may be cantilever mounted at a first end 190 of the keycap 150. That is, the keycap 150 is supported at the first end 190 of the keycap 150. The first end 190 of the keycap 150 is the end of the keycap 150 which is nearest to the display cover 152. In the example illustrated, the keycap 150 and the display cover 152 may be a single component, which may be referred to as an integrated keycap/display cover.

Although not visible in FIG. 1, the key assembly 193 generally includes one or more electrical switches mounted within the housing 102 beneath the keycap 150. The electrical switches mounted beneath the keycap 150 are each associated with corresponding function keys 106a, 106b, 106c, 106d. The electrical switches are connected to one or more controllers, such as one or more processors associated with the electronic device 100 and provide input signals to the processors. The electrical switches are each associated with and aligned with corresponding keys.

Where the keycap 150 is cantilever mounted at the first end 190 of the keycap 150, the keycap 150 may deflect at its second end 192, which is opposite the first end 190, in response to the application of an external force on the external surface of the keypad. When such a deflection occurs, the keycap 150 may actuate the electrical switch which is associated with the portion of the keycap where the external force was applied. In at least some example embodiments, the electrical switches are disposed beneath the second end 192 of the keycap.

In the example embodiment illustrated, the electrical switches may be located in a position which permits them to be actuated by a portion of the keycap which is located between the second end 192 and the decorations 156a, 156b, 156c, 156d. By locating the electrical switches in this position, the space beneath the decorations 156a, 156b, 156c, 156d on the keycap 150 is not obstructed by the electrical switches. Locating the electrical switches away from the decorations 156a, 156b, 156c, 156d facilitates backlighting of the keycap 150. The electrical switches may be dome switches, in some embodiments.

The embodiment illustrated in FIG. 1 shows a single piece keycap 150 that includes a plurality of function keys 106a, 106b, 106c, 106d. When a force is applied to the keycap 150 at one of the function keys 106a, 106b, 106c, 106d, there may be a tendency for an adjacent key to also depress, thereby engaging its associated electrical switch. Accordingly, the key assembly may include features which prevent or inhibit movement of keys 106a, 106b, 106c, 106d, when the adjacent key is depressed. Such features may include, for example, indentations or grooves (not shown) on the interior surface of the keycap 150 between keys 106a, 106b, 106c, 106d which allows the keycap 150 to bend.

The electronic device 100 may include additional input devices in addition to the input devices discussed above. In the example embodiment of FIG. 1, the electronic device 100 includes a navigational input device 180. In the illustrated embodiment, the keycap 150 defines a passageway through which the navigational input device 180 extends. The navigational input device 180 may be comprised of a trackpad. In other embodiments, the navigational input device 180 may be a trackball. Other navigational input devices 180 are also possible. In some cases, no navigational device may present in this location.

Figure 2:
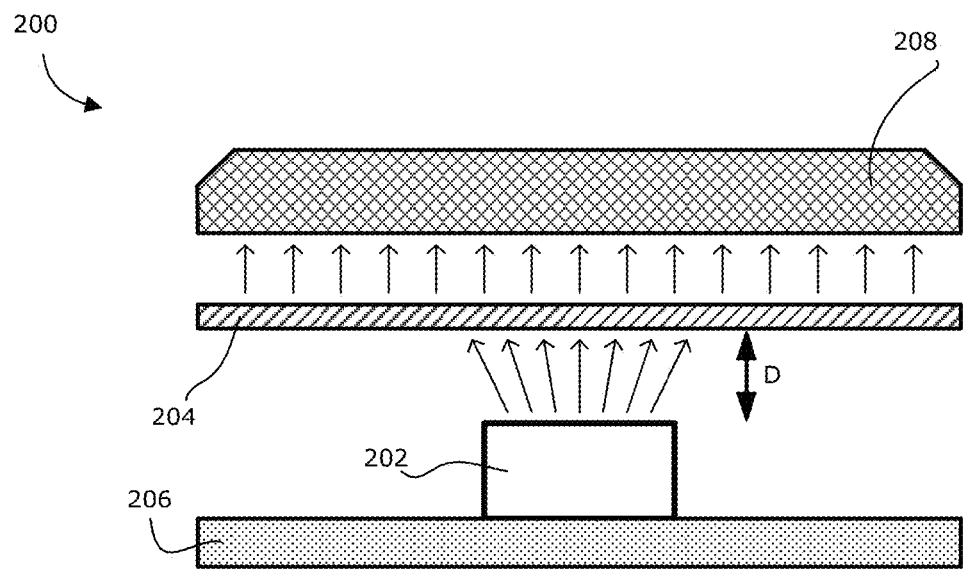
FIG. 2 diagrammatically illustrates a cross-sectional view of a portion of an example key assembly.

Reference is now made to FIG. 2, which diagrammatically illustrates a cross-sectional view of a portion of an example key assembly 200. For clarity, only some elements of a typical key assembly are illustrated in FIG. 2. The portion of the key assembly 200 includes an optical source, which in this example is a top-fire LED 202. The LED 202 is mounted or attached to a subsurface, such as a printed circuit board (PCB) 206 or other such substrate. The portion of the key assembly 200 includes a light guide 204 under a keycap 208. The LED 202 is spaced from the underside of the light guide 204 by a distance D. The light guide may include a light guide foil, such a polycarbonate or other type of moldable flexible plastic, or any other type of light guide, including hard-plastic light guides.

The LED 202 emits light upwards generally directed towards the light guide 204. The light guide 204 functions to disperse the light such that the light that passes through the light guide 204 towards the keycap 208 is more uniformly distributed than the light incident on the underside of the light guide 204. The keycap 208 may be structured to permit at least a portion of light incident on its underside to pass through and exit through a decoration or diagram on its upper surface (not shown), thereby illuminating (backlighting) the decoration. In general, the keycap 208 is structured to prevent light from exiting surfaces of the keycap other than through the decoration. This may be accomplished using foils, paints, or other techniques applied to the surface of the keycap 208 in some embodiments. The decorations and/or diagrams are non-opaque portions of the keycap 208.

Figure 3:
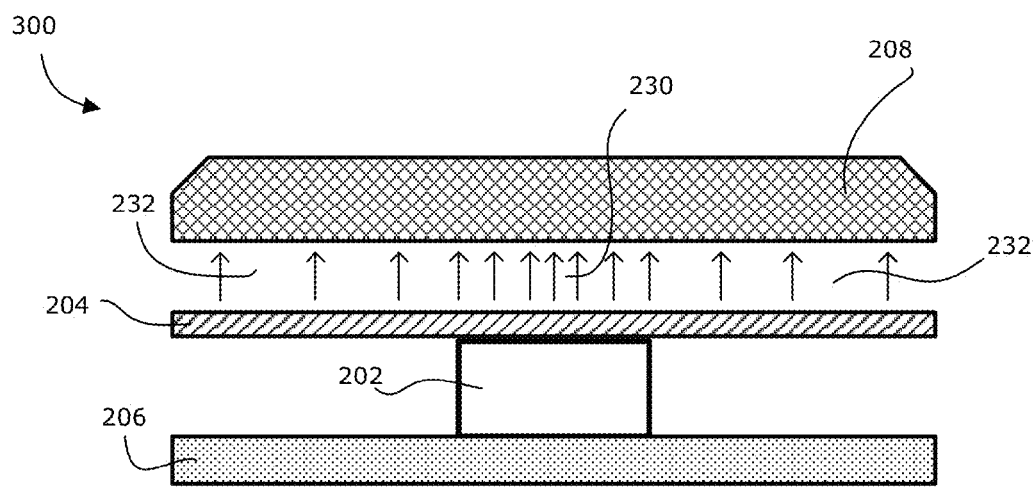
FIG. 3 illustrates a cross-sectional view of a portion of another example key assembly.
Figure 4:
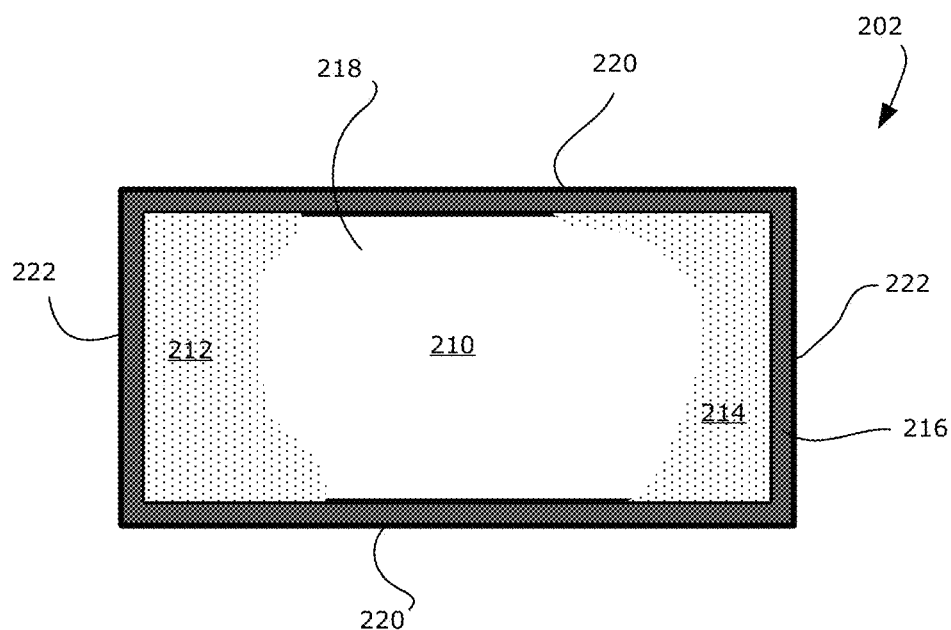
FIG. 4 shows a top view of a top-fire LED, including its housing and top surface.

Reference is now made to FIG. 3 and FIG. 4. FIG. 3 shows another embodiment of a portion of an example key assembly 300. In the example shown in FIG. 3, the key assembly 300 is constructed such that there is no gap between the LED 202 and the light guide 204. This may advantageously reduce the thickness of the key assembly 300, thereby enabling the creation of thinner electronic devices.

FIG. 4 shows a top view of the top-fire LED 202. The LED 202 includes a housing 216, the edges of which are visible in the illustration, and a top surface 218 through which the LED 202 emits light. It will be noted, that the LED 202 is rectangular in structure with two long sides 220 and two short sides 222. The light emitted from the top-fire LED 202 is not a uniform spectrum across the entire top surface of the LED 202. The light emitted from the center portion of the LED 202 tends to be broad spectrum white light (generally indicated by reference number 210), whereas the areas furthest from the center, particularly near the short sides 222, tend to emit light that has a yellow tint (generally indicated by reference numbers 212 and 214). Although the present example depicts a rectangular LED, the present application is not limited to rectangular LEDs. The problem of skewed colour spectrum at the edges of the LED top surface is particularly noticeable in rectangular LEDs, but can also occur in other shaped LEDs, including square and even round LEDs.

The yellow tinted light at the edges of the top surface 218 tends to become visible when a reflector is placed in front of the LED top surface 218, such that a portion of the light emitted from the LED 202 is reflected back into the LED 202, causing the yellow-tinted areas of the LED to become more illuminated and, thus, to cause the light that eventually leaves the LED 202 to appear yellower at its edges. In a key assembly, like key assembly 200 (FIG. 2), in which the LED 202 is spaced apart from the light guide 204 by a distance D, the light emitted from the central portion of LED 202 does not significantly reflect back into the LED and does not significantly illuminate the more yellow portions of the LED top surface 218. Accordingly, the yellowish light 212, 214 does not appear in the configuration shown in FIG. 2.

In the key assembly 300 the LED 202 is in direct contact with the underside of the light guide 204, and the light emitting from the LED 202 is directly injected into the light guide 204. The net effect is an uneven dispersal of light within the light guide 204, such that the light exiting the upper side of the light guide 204 tends to be brighter in the region directly above the LED 202 (generally indicated by reference numeral 230), and tends to be dimmer in the region away from the LED 202 (generally indicated by reference numeral 232). Moreover, the reduced dispersal also results in a yellow tint to portions of the light exiting the top side of the light guide 204.

Accordingly, placing the light guide 204 directly atop the LED 204 without a significant gap between them may result in illuminated decorations in the keycap 208 that have shadowed areas and/or that have a yellow tint.

Although in this example, the tint is described as being yellow, with different types of LEDs other tints may occur depending on the construction and operation of the specific LED.

Figure 5:
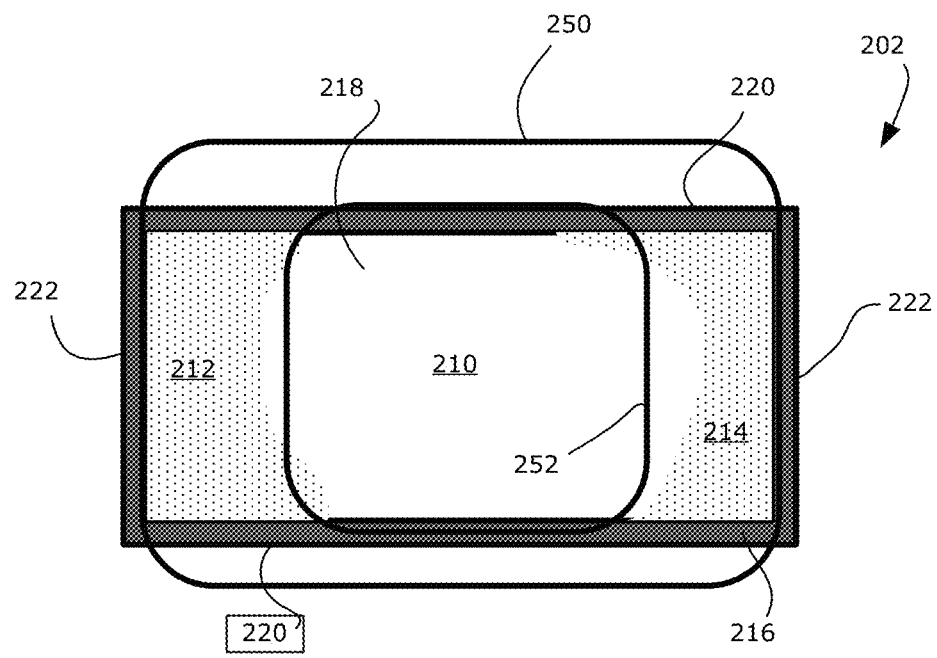
FIG. 5 shows the top view of FIG. 4 with an opaque mask affixed to the top surface.

Reference is now made to FIG. 5, which shows the top view of the example top-fire LED 202 with a mask 250. The mask 250 is affixed to the top surface 218 of the LED 202. In this embodiment, the mask 250 is an opaque material having an aperture 252 through which light may pass. It may be referred to herein as an optical mask. The optical mask 250 is sized and positioned over the top surface 218 so as to line up the aperture with the white light emitting portion 210 of the top surface 218. The opaque material is generally positioned so as to block light from the yellow-tinted portions 212, 214 of the top surface 218.

The optical mask 250 may be formed from opaque tape, in some embodiments. Other opaque materials may also be used.

Figure 6:
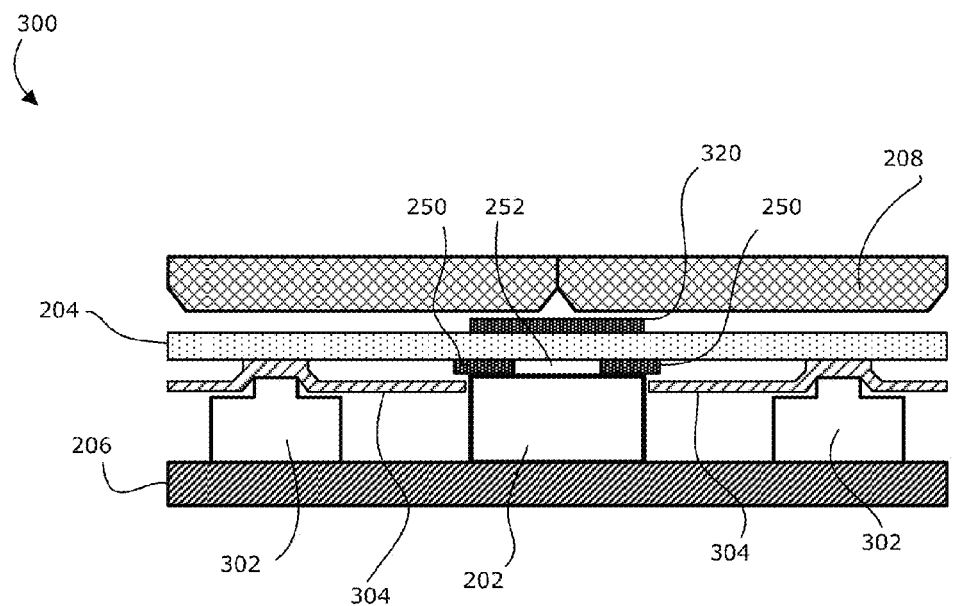
FIG. 6 shows a cross-sectional view of a portion of a simplified example stack-up for a key assembly.
Figure 7:
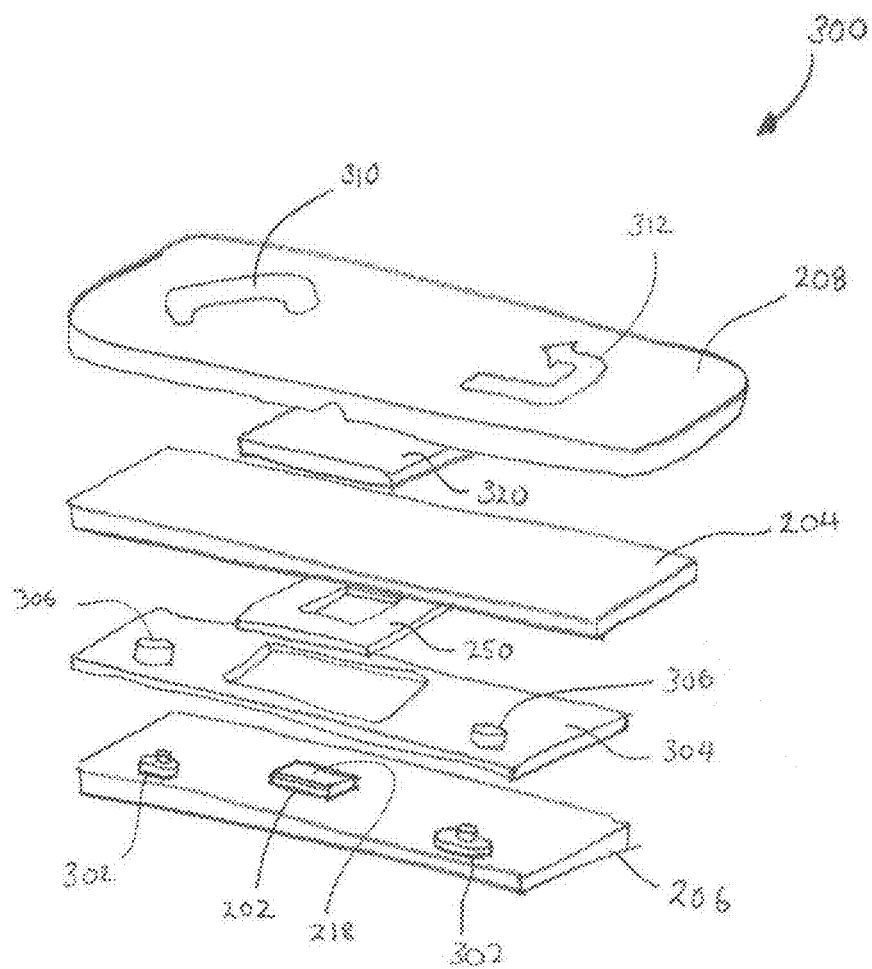
FIG. 7 shows an exploded view of the portion of the simplified example key assembly of FIG. 6.

Reference is now made to FIG. 6 and FIG. 7. FIG. 6 shows a cross-sectional view of a part of a stack-up of one example of the key assembly 300. FIG. 7 shows an exploded view of the stack-up of the example of the key assembly 300. Not all elements or components are necessarily shown in the example. For clarity of explanation, adhesives, shims, chassis, or other such spacing and/or securing components are not necessarily illustrated. Moreover, the thickness of elements has been exaggerated in this simplified diagram for ease of illustration.

In this simplified example, the keycap 208 is illustrated as a single piece having two keys. The two keys have non-opaque decorative indicia 310, 312 on the outer surface.

The key assembly 300 includes a PCB 206 or other substrate on which are mounted two electrical switches (e.g. two dome switches) 302 and the top-fire LED 202. A mylar foil 304 with suitable shaping overlays the dome switches 302. The mylar foil 304 may features plungers 306 above the respective dome switches 302. The mylar foil 304 also features an aperture so that the mylar foil 304 does not overlay the LED 202. The optical mask 250 sits atop the LED 202 top surface 218, positioned as explained above to block yellow light from entering the light guide 204. The aperture 252 within the optical mask 250 is aligned with the white-light emitting portion 210 of the LED 202 to allow that light to pass upwards into the light guide 204. The light guide 204 is directly atop the optical mask 250.

As best seen in FIG. 6, the light guide 204 is also in contact with the plungers 306 of the mylar foil 304. In the depicted embodiment, the light guide 204 is a flexible light guide foil that may be shaped or formed as needed.

The keycap 208 is positioned above and spaced apart from the light guide 204. Although not shown, the keycap 208 may include silicone or other foils on its underside.

In this example, the key assembly 300 further includes a cover tape 320. The cover tape 320 is an opaque material adhered to a central portion of the top surface of the light guide 204. The cover tape 320 generally blocks light from escaping through the central portion of the light guide 204. This may prevent light leakage through the middle portion of the keycap 208. As shown in this example, the keycap 208 may include a groove or other feature that increases the likelihood of light leakage between the keys. In yet other examples, the keycap 208 may not be a continuous piece, and may be formed from separate pieces for each key, which poses the possibility of light leakage between keys. The cover tape 320 may have a partially mirrored undersurface facing the light guide 204 so as to direct any light incident on the cover tape 320 back into the light guide 204.

It will be appreciated that although the above embodiments featured a top-fire LED, other optical radiation sources that emit light from a surface may be used in other implementations.

To distribute light, the light guide 204 is constructed of a material that is transparent or, in some example embodiments, translucent. For example, the light guide 302 may, in at least some example embodiments, be constructed of a clear plastic or silicone.

In at least some example embodiments, the keycap 208 is an in-mould-decorated keycap. In-mould decoration is a type of plastic moulding which may be used for decorating plastic surfaces with color. In-mould decoration may be used to produce a keycap having a plastic body that transmits optical radiation and which has an artwork layer located on an external surface of the plastic body. The plastic body may be formed from a plastic that is generally translucent or transparent, such as a clear plastic. The artwork layer may include the one or more graphics (e.g. the non-opaque decorations 156a, 156b, 156c, 156d of FIG. 1) which are to be illuminated. The graphics (e.g. the non-opaque decorations 156a, 156b, 156c, 156d) typically include at least a portion which is of a different color than the background color of the artwork layer. To provide backlighting of the keys, the decorations (e.g. 156a, 156b, 156c, 156d) are typically designed to be at least partially translucent. That is, the decorations permit at least some light to pass through. The background color region provides the keycap 208 with a background color. The background color is the color that is applied to a large portion of the external surface of the keycap 208. The background color is, in at least some example embodiments, an opaque color, such as black. In other example embodiments, the background color may be a more translucent color, such as white. Other, colors may also be used.

In other embodiments, in-mould decoration is not used for providing graphics on the keys. Other techniques may be used to form the keycap 208.

Figure 8:
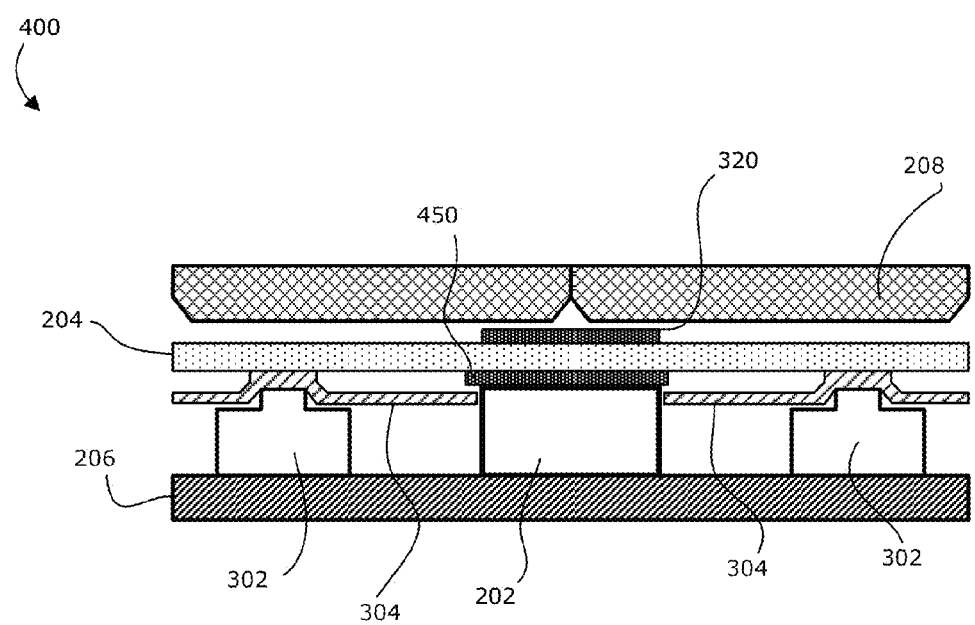
FIG. 8 shows a cross-sectional view of a portion of another example stack-up for a key assembly.

Reference is now made to FIG. 8, which shows another example embodiment of a key assembly 400. FIG. 8 shows a cross-sectional view of a part of a stack-up of this embodiment. The difference from FIG. 6 is that key assembly 400 includes an optical mask 450 that is at least partially transparent and does not have an aperture. In particular the optical mask 450 is a filter. The colour spectrum selected for filtering by the LED mask 450 may depend on the characteristics of the LED 202; however, in one embodiment the optical mask 450 is blue-transparent foil to filter out yellowish portions of the spectrum such that the light entering the light guide 204 is substantially cool white.

The example embodiments of the present disclosure described above are intended to be examples only. Those of skill in the art may effect alterations, modifications and variations to the particular embodiments without departing from the intended scope of the present disclosure. In particular, features from one or more of the above-described example embodiments may be selected to create alternate example embodiments included of a sub-combination of features which may not be explicitly described above. In addition, features from one or more of the above-described example embodiments may be selected and combined to create alternate example embodiments included of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A key assembly for an electronic device, the key assembly comprising:
    an optical radiation source having a surface through which light is emitted, in use;
    a mask blocking a portion of the light emitted by the optical radiation source, in use;
    a light guide; and
    a keycap, defining a key, the keycap having a non-opaque portion; and
    wherein the mask is located between the surface and the light guide, and the light guide is located between the mask and the keycap, such that the keycap receives optical radiation emitted from the optical radiation source that is not blocked by the mask.

2. The key assembly of claim 1, wherein the optical radiation source is a light emitting diode (LED).

3. The key assembly of claim 2, wherein the LED is a top-fire LED that emits the light from a top surface of the LED.

4. The key assembly of claim 3, wherein the top surface of the LED is rectangular, and wherein the portions of the top surface of the LED nearest the shorter sides of the rectangle emit light having a tinted spectrum.

5. The key assembly of claim 4, wherein the mask comprises an opaque mask having an aperture defined therein and wherein the aperture is positioned over at least a portion of the top surface, and wherein at least a part of the opaque mask obscures the portions of the top surface emitting the tinted spectrum.

6. The key assembly of claim 1, wherein the mask comprises an opaque mask having an aperture defined therein and wherein the aperture is positioned over at least a portion of the surface, and wherein at least a part of the opaque mask obscures at least a portion of the surface.

7. The key assembly of claim 6, wherein the optical radiation source is configured to emit white light through a portion of the surface and is configured to emit tinted light through one or more other portions of the surface, and wherein the opaque mask is positioned to have its aperture over the portion configured to emit white light and to block the portions configured to emit tinted light.

8. The key assembly of claim 6, wherein the opaque mask is an opaque tape affixed to the surface of the optical radiation source.

9. The key assembly of claim 8, wherein the opaque tape comprises a die cut black tape adhered to the surface of the optical radiation source.

10. The key assembly of claim 1, wherein the light guide comprises a light guide foil.

11. The key assembly of claim 1, wherein the light guide comprises a hard-plastic light guide.

12. The key assembly of claim 1, wherein the light guide has a lower surface facing the mask, and the light guide includes adhesive on its lower surface, and wherein the adhesive affixes the light guide to the mask.

13. The key assembly of claim 1, further comprising a cover tape adhered to a portion of an upper surface of the light guide.

14. The key assembly of claim 13, wherein an underside of the cover tape is at least partly reflective.

15. The key assembly of claim 14, wherein the cover tape is disposed approximately in line with the optical radiation source.

16. The key assembly of claim 1, wherein the mask comprises a filter, and wherein the filter covers the whole of the surface.

17. The key assembly of claim 16, wherein the filter comprises a blue-transparent foil.

18. An electronic device comprising:
a controller for controlling the operation of the electronic device;
a display connected to the controller;
at least one electrical switch connected to the controller for generating an input signal in response to actuation thereof; and
a key assembly as claimed in claim 1.

19. The electronic device of claim 18, wherein the optical radiation source is a top-fire light emitting diode (LED) that emits the light from a top surface of the LED.

20. The electronic device of claim 18, wherein the mask comprises an opaque mask having an aperture defined therein and wherein the aperture is positioned over at least a portion of the surface, and wherein at least a part of the opaque mask obscures at least a portion of the surface.

* * * * *